UNITED STATES PATENT OFFICE.

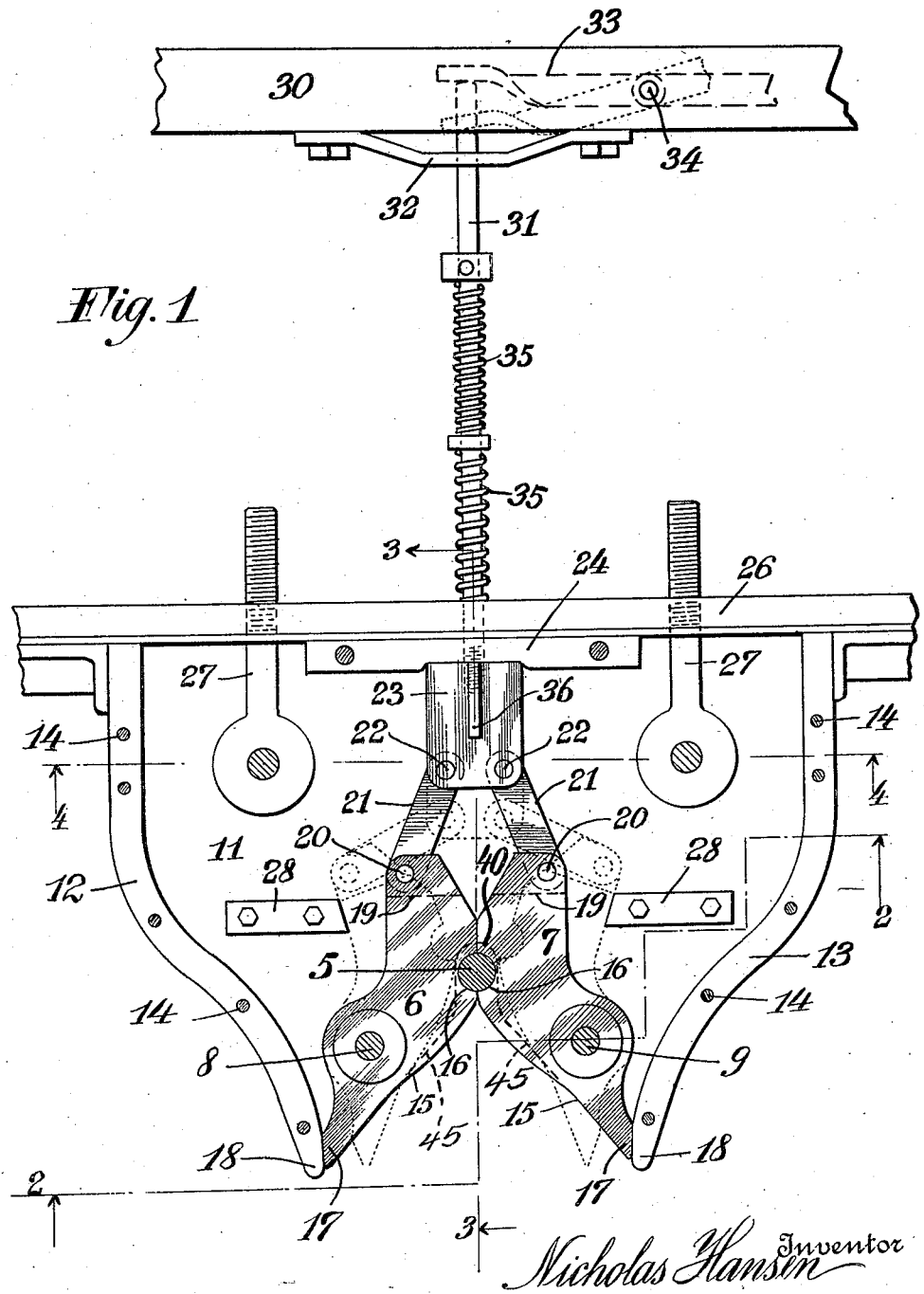

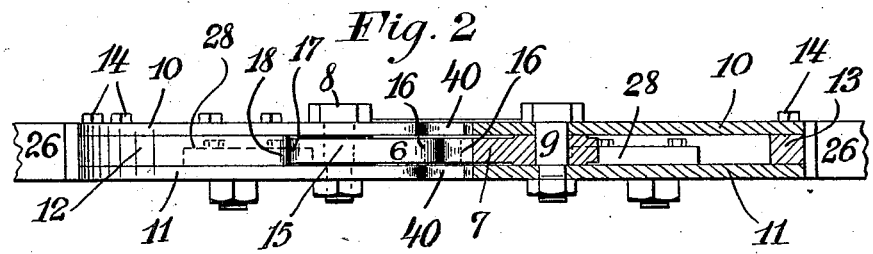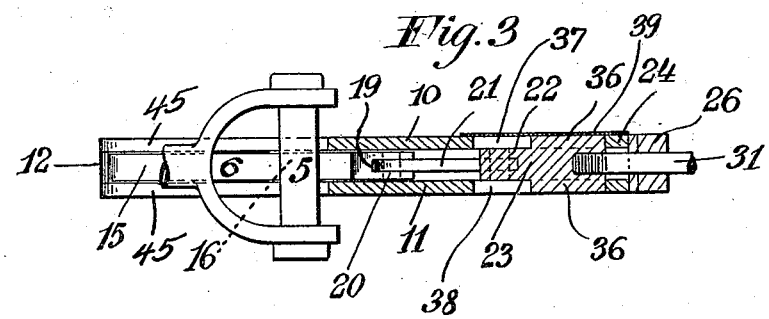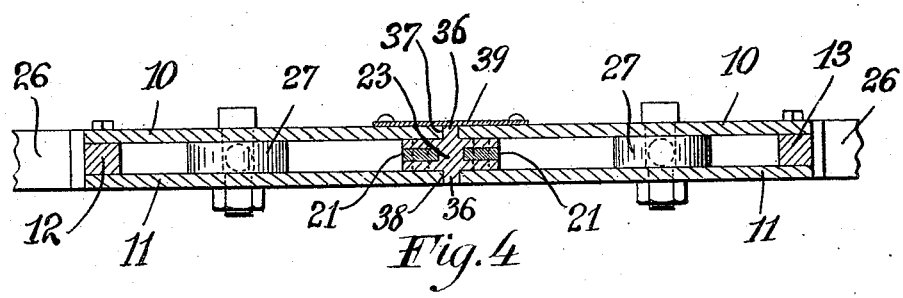

NICHOLAS HANSEN, OF BOGOTA, NEW JERSEY.

COUPLING DEVICE.

1,416,020. Specification of Letters Patent. Patented May 16, 1922.

Application filed October 1, 1920. Serial No. 414,013.

*To all whom it may concern:*

Be it known that I, NICHOLAS HANSEN, a citizen of the United States, and resident of Bogota, in the county of Bergen and State of New Jersey, have invented certain new and useful Improvements in Coupling Devices, of which the following is a specification.

This invention relates to improvements in couplings. More particularly this invention relates to an improved coupling device for use to couple trailers, agricultural machines and machines to power driven vehicles. The object of the invention is to provide a generally improved coupling device adapted to be easily attached to the power driven vehicle and whereby another vehicle may be quickly and automatically coupled to the power driven vehicle. Accordingly my invention is embodied in a coupling device constructed and arranged as hereinafter set forth while reference is had to the accompanying drawings in which—

Fig. 1 is a plan view of a coupling device embodying my invention with parts removed and parts shown in section.

Fig. 2 is a front view of the device taken on the line 2—2 of Figure 1.

Fig. 3 is a sectional view of the device taken in line 3—3 of Figure 1 with parts removed.

Fig. 4 is a sectional view of the device taken on line 4—4 of Figure 1.

Referring to the drawings the coupling member on the one vehicle is shown in the form of a heavy pin or bolt 5, see Figures 1 and 3. This pin or bolt 5 may extend from the one vehicle (not shown) in any suitable manner.

The other coupling member consists of pair of jaws 6 and 7 which are pivoted at 8 and 9 respectively between two plates 10 and 11. The plate 10 which is the top plate is removed in Figure 1. The two plates are symmetrical and spaced apart by edge members 12 and 13 and the parts are secured together by pins and bolts 14, 14.

The two plates 10 and 11 together with the edge members 12 and 13 form a casing within which the coupling members 6 and 7 and their associated parts are contained. The plates are formed with a forwardly facing cut out portion or throat as shown and indicated by the converging portions denoted 45, 45.

Each jaw 6 and 7 is formed with a cam edge 15, a jaw portion 16 adapted to engage the other coupling member 5. Forwardly the jaws are formed with stop portions 17, 17 adapted to abut stops 18, 18 of the members 12 and 13. At the rear the jaws are cut out as at 19, 19 and are pivoted as 20, 20 to links 21, 21. These latter are in turn pivoted at 22, 22 to a crosshead or slide 23 back of which is a resistance member 24 also secured to the plates 10 and 11. These latter and the edge members 12 and 13 are secured in any suitable manner to a framework 26 and the entire device is attached to the vehicle by suitable anchor bolts 27, 27. 28, 28 are stops within the casing aforesaid.

The numeral 30 denotes another frame which may represent part of a vehicle. A push rod or stem 31 is attached to the slide 23 and extends rearwardly through a guide piece 32. A lever 33 may be pivoted at 34 on the frame 30 and operated by the operator in any suitable manner (not shown). The slide 23 is pulled rearwardly by springs 35, 35.

In order to guide the slide in its movements it is provided with top and bottom keys 36, 36 which slide in slots 37 and 38 in the upper and lower plates 10 and 11 respectively. A plate 39 may be used as a shield to cover up the slot 37 in the top plate 10. The two plates 10 and 11 are cut out as at 40, 40.

As stated above the frame 26 and with it the coupling device is attached to the one vehicle (not shown) while the member 5 represents the coupling member on the other vehicle (not shown). The normal or coupled position of the jaws is shown in full lines in Figure 1, while their position at the moment when the jaws open is shown in dotted lines.

When it is desired to couple the two vehicles together, the one with the member 5 is backed into the other so that the member 5 comes against the jaws 6 and 7, and the backing is continued until the member 5 forces the jaws apart and the latter open momentarily to catch the member 5 in the jaw portions 16, 16 which snap close upon said member.

The two vehicles are now securely coupled together and as the tractor (represented by the frame 30) is pulled away and moves the other vehicle with it.

When it is desired to uncouple the operator moves the lever 33 by any suitable means (not shown) and opens the jaws as shown after which the member 5 is pulled away from the jaws.

The advantages of the construction illustrated and described are many. It is a very simple, rather small and flat piece of mechanism which is not apt to get out of order. The cam surfaces of the jaws and the cut out or throat at 45, 45 serve to guide the member 5 into coupling position no matter from which direction the member 5 is moved against the coupling device. And while the member 5 slides along the jaw faces, the stops 17 and 18 serve as stiffening means for the jaws as will be understood. The cut outs in the plates at 40 serve to finally position the member 5.

When the coupling is released, the jaws may open sufficient to release the member 5, but the stops 28 prevent too much opening of the jaws.

A particular advantage of the foregoing construction resides in the fact, that the coupling device may be used with a coupling member such as shown at 5, and does not require any particular form of draw bar or draw head. In other words, the vertical dimensions of the coupling member and the coupling device have no effect or are of no importance in the use of the device within reasonable limits.

It will be understood that details in the attaching frame construction may be altered to suit the particular types of vehicles to which the coupling device may be attached, also, that other changes in the construction may be made without departing from the principle of the invention and the scope of the appended claim.

I claim:

The combination with a relatively vertically disposed coupling member, of a coupling adapted to receive and to be coupled to said coupling member, said coupling comprising a relatively flat casing consisting of an upper and a lower symmetrical plate, a frame, means for joining said plates and frame, anchor bolts attached to the said plates for attaching the said casing to a vehicle, a pair of coupling jaws pivoted between said plates, a slide, links pivoted to the latter and to the said jaws, keyways formed in said plates, keys on said slide adapted to move in said keyways to guide the slide, a rod in the latter projecting rearwardly from the said casing, a plurality of springs on said rod for maintaining the slide in normal rearward position and the jaws in coupling position, means for operating the slide to open the jaws, stops secured to said plates to limit the opening movement of the jaws, stop portions formed on the latter and adapted to abut the said casing forwardly of the jaw pivots, said casing being provided with an open throat formed cut out portion adapted to receive and guide the said coupling member into automatic engagement with the said coupling irrespective of the relative vertical dimensions of the latter and the coupling member.

NICHOLAS HANSEN.